(12) United States Patent
Leu

(10) Patent No.: US 6,262,669 B1
(45) Date of Patent: Jul. 17, 2001

(54) VOICE DIAGNOSTIC APPARATUS FOR MAINBOARD

(75) Inventor: Sophie Leu, TaiPao (TW)

(73) Assignee: Hsin-Chan Lu, ChiaYi Hsien (TW)

( * ) Notice: Subject to any disclaimer, the term of this patent is extended or adjusted under 35 U.S.C. 154(b) by 0 days.

(21) Appl. No.: 09/391,253

(22) Filed: Sep. 7, 1999

(51) Int. Cl.⁷ .................................................. G08B 21/00
(52) U.S. Cl. ......................... 340/635; 340/692; 702/185; 702/186
(58) Field of Search .............................. 347/635, 691.6, 347/692; 702/182, 183, 185, 186

(56) References Cited

U.S. PATENT DOCUMENTS

| | | | |
|---|---|---|---|
| 4,389,546 | * | 6/1983 | Glisson et al. ......................... 379/88 |
| 4,498,078 | * | 2/1985 | Yoshimura et al. ................. 702/185 |
| 4,823,343 | * | 4/1989 | Takahashi ............................... 714/46 |
| 4,858,152 | * | 8/1989 | Estes ..................................... 702/186 |
| 5,062,147 | * | 10/1991 | Pickett et al. .......................... 714/46 |
| 5,583,801 | * | 12/1996 | Croyle et al. ........................ 702/115 |

* cited by examiner

Primary Examiner—Edward Lefkowitz

(57) ABSTRACT

A voice diagnostic system for diagnosing the mainboard of a computer system comprises a decoder, a thermal sensor, voice control device and a speaker. The decoder is connected via buses to the a voice control device. The decoder decides which peripheral component is out of order or in an abnormal status based on the problem signal from a defective peripheral component. The speaker generates a sound corresponding to the problem signal from the voice control device. Users can immediately tell the defective peripheral components by the sound of problem signals.

2 Claims, 2 Drawing Sheets

VOICE DIAGNOSTIC APPARATUS FOR MAINBOARD

FILED OF THE INVENTION

The present invention relates generally to voice diagnostic systems of a mainboard, and more particularly to an on-board diagnostic system for easily diagnosing the mainboard by speech sound without using an external maintenance card.

BACKGROUND OF THE INVENTION

In the computer assembly process, there are many types of problems unavoidable, such as assembly faults, incompatibilities of mainboards and interface cards, and wiring faults. These problems may cause boot startup malfunctions for a computer system.

Conventional diagnostic approach in assembling a computer system is by means of an external maintenance card inserted in a socket of a mainboard. A display unit attached on the mainboard is to indicate meaningful numbers or light bubble numbers based on the received diagnosing results. Problems are being found and solved by interpreting these numbers according to their definitions in the maintenance manual.

Because it requires extra and expensive cost for a client to buy an external maintenance card, the client of a computer system usually doesn't purchase the external maintenance card. As a result, an external maintenance card is only limitedly used by specific persons, such as maintenance technicians. In the mean time, it wastes time and money for a client to request diagnosing a computer system when the computer system is out of order.

For these and other reasons, it may be desirable to have clients diagnose computer systems when they assemble computer systems by themselves. Once an error is found, it may be desirable to have clients debug the error using a cheaper and more convenient diagnostic system. Therefore, the present invention provides an on-board voice diagnostic system.

SUMMARY OF THE INVENTION

The primary object of the present invention is to provide a voice diagnostic system for a mainboard. Wherein, a decoder built in the mainboard is connected via buses to voice control device. Once a hardware error message is launched, the decoder can decide which peripheral component is out of order or in an abnormal status based on the error message. Then, the voice control device speaks out a sound corresponding to the error message by a speaker. Users may easily tell the abnormal operating status or find out the defective peripheral components by the sound of error message.

Another object of the present invention is to provide a voice diagnostic system for a mainboard. A thermal sensor built in the mainboard is to ensure a CPU to work in an optimum temperature. After a computer is booted startup from a hard disk and an error message is displayed, the CPU's working temperature can be spoked out from the voice control device with the speaker. That allows users to be immediately aware of the status of CPU to confirm whether it will be over heated or burned out.

Accordingly, the present invention is to provide an on-board voice diagnostic apparatus comprising a decoder, a thermal sensor, a voice control device, and a speaker. Wherein, the decoder is connected via buses to the voice control device. When defective information is diagnosed, the decoder can find out the defective peripheral component based on the information. Then, an error sound is spoked by the speaker from the voice control device. That makes users be aware which peripheral component breaks down.

The foregoing and other objects, features, aspects and advantages of the present invention will become more apparent from a careful reading of a detailed description provided herein below, with appropriate reference to the accompanying drawings.

DETAILED DESCRIPTION OF THE PREFERRED EMBODIMENTS

Figure 1:
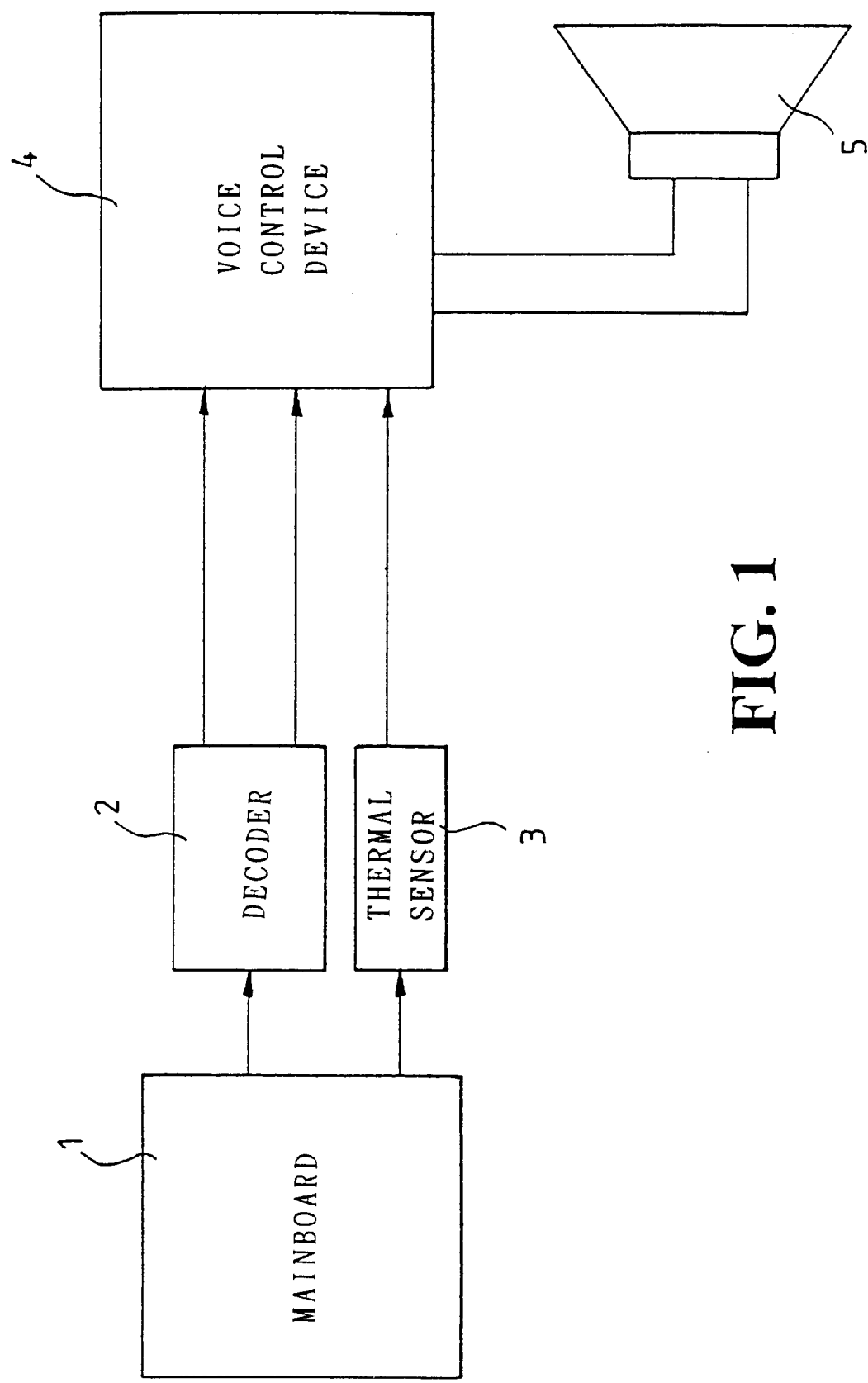
FIG. 1 illustrates the circuitry of the present invention.

As shown in FIG. 1, the voice diagnostic apparatus of the invention comprises a mainboard 1, a decoder 2, a thermal sensor 3, a voice control device 4 and a speaker 5. The decoder 2 and the thermal sensor 3 are mounted on the mainboard 1. The decoder 2 is connected via buses to the voice control device 4. The thermal sensor 3 is linked to the voice control device 4. The voice control device 4 is linked to the speaker 5. The speaker 5 is installed in an available space on the external slug cover of a computer.

If a peripheral component or one of the hardware is out of order or in an abnormal status, the decoder 2 receives a message and decides which peripheral component is out of order or in an abnormal status. The decoder 2 immediately transmits the signal message to the voice control device 4. The speaker 5 launches a preset sound to tell users which peripheral component is out of order or in an abnormal status based on the corresponding sound. The problems of the peripheral components may further be solved according to the corresponding sound without using an external maintenance card.

Figure 2:
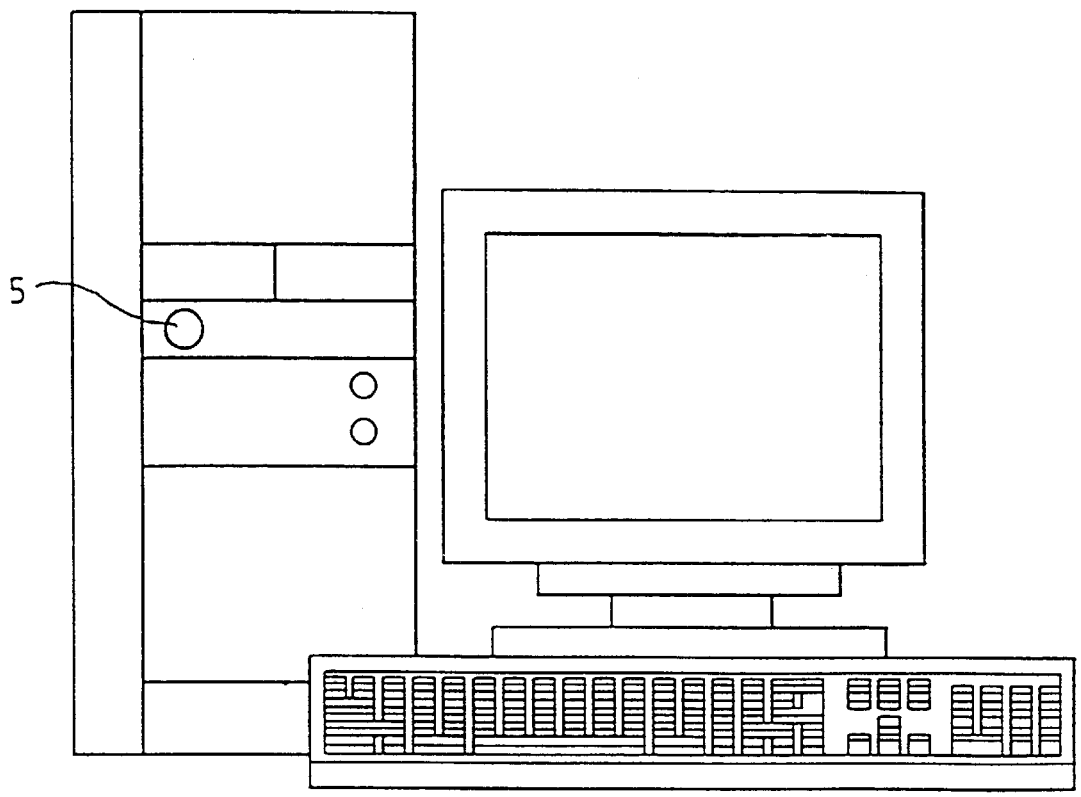
FIG. 2 illustrates the embodiment of the present invention built in the cover of a computer.

As shown in FIG. 2, the speaker 5 is located at front or rear side of the external slug cover of a computer. The speaker 5 is connected via communication link (not visible in the drawing) to the voice control device 4. The speaker 5 launches the sound corresponding to the signal message via the decoder 2 and the voice control device 4. Users may thus know the operating status of peripheral components directly from the sound corresponding to the signal message.

In addition, the thermal sensor 3 is built in the mainboard 1. After computer system is booted startup from a hard disk and the signal message of a problem is indicated, the thermal sensor 3 transmits the inspected temperature signal to the voice control device 4. Then, the speaker 5 launches the sound corresponding to the inspected temperature signal. That allows users to be immediately aware of the CPU's operating temperature status to confirm whether it will be over heated or burned out.

Although this invention has been described with a certain degree of particularity, it should be understood that the present disclosure has been made by the way of the preferred embodiment only. And, that numerous changes in the detailed construction and combination as well as arrangement of parts may be restored to without departing from the spirit or scope of the invention as hereinafter set forth.

What is claimed is:

1. A voice diagnostic apparatus of a computer, comprising:

a decoder mounted on a mainboard of said computer, said decoder receiving an error message and decoding said error message to identify a defective peripheral on said computer or a defective component on said mainboard that fails a computer to boot up;

a voice control device coupled to said decoder for generating a control signal according to said defective peripheral or said defective component; and a speaker coupled to said voice control device for announcing said defective peripheral or said defective component;

wherein said voice diagnostic apparatus detects a defective peripheral or component that fails to boot up said computer while said computer is powering on and announces said defective peripheral or component.

2. A voice diagnostic apparatus of a computer, comprising:

a decoder mounted on a mainboard of said computer, said decoder receiving an error message and decoding said error message to identify a defective peripheral on said computer or a defective component on said mainboard that fails a computer to boot up;

a voice control device coupled to said decoder for generating a control signal according to said defective peripheral or said defective component;

a speaker coupled to said voice control device for announcing said defective peripheral or said defective component; and a thermal sensor mounted on said mainboard, said thermal sensor detecting the temperature of a CPU on said mainboard and sending a temperature signal to said voice control device, and said voice control device generating a control signal to said speaker for announcing said temperature of said CPU.

* * * * *